Figure 1:
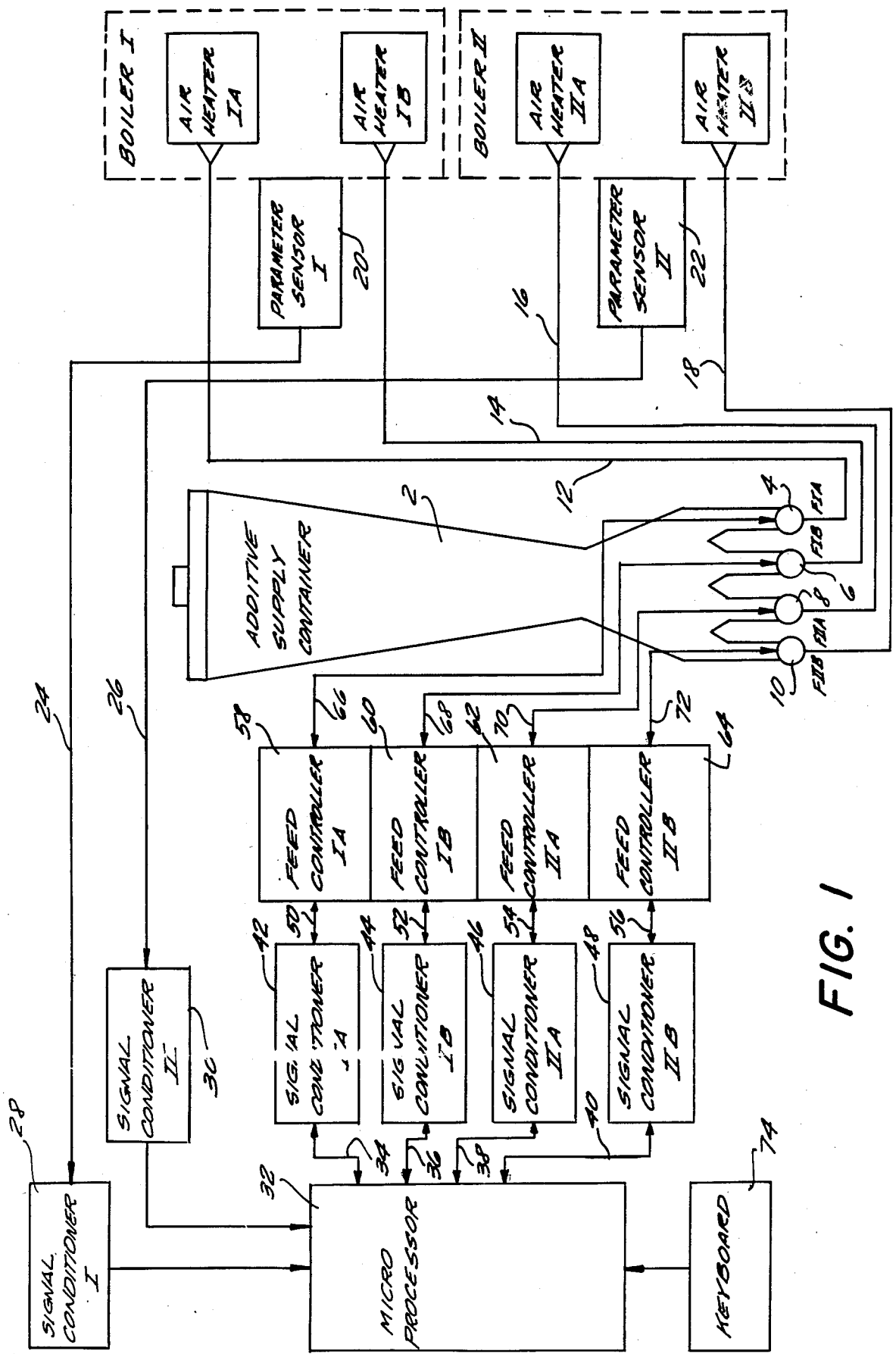

United States Patent [19]

Kukin et al.

[11] Patent Number: 4,793,268
[45] Date of Patent: Dec. 27, 1988

[54] METHOD FOR CONTROLLING ADDITIVE FEED IN A BOILER SYSTEM

[75] Inventors: Ira Kukin, West Orange; William C. Pepe, Stanhope, both of N.J.

[73] Assignee: Apollo Technologies Int'l, Morris Plains, N.J.

[21] Appl. No.: 125,926

[22] Filed: Nov. 27, 1987

[51] Int. Cl.⁴ .................................................. F23B 7/00
[52] U.S. Cl. ...................................... 110/343; 110/344; 110/345; 236/15 E
[58] Field of Search ............... 236/15 E; 110/342, 343, 110/344, 345; 122/448 R, 448 B; 44/1 SR

[56] References Cited

U.S. PATENT DOCUMENTS

| | | | |
|---|---|---|---|
| 3,837,820 | 9/1974 | Kukin | 44/5 |
| 4,515,092 | 5/1985 | Walsh et al. | 110/342 X |
| 4,648,331 | 3/1987 | Thelen | 110/342 |
| 4,685,072 | 8/1987 | Johnson et al. | 236/15 E X |

*Primary Examiner*—Edward G. Favors
*Attorney, Agent, or Firm*—James & Franklin

[57] ABSTRACT

The method of operation of a boiler system to which an additive is to be fed at a controlled rate and in which the optimal additive rate depends upon a plurality of changing parameters of the boiler system, in which the relationship between each of those parameters and the optimal additive feed rate is determined, the relevant parameters are sensed during the operation of the system, their effects on optimum additive feed are computed in accordance with said relationships and combined on a continuous basis to produce a control signal representative of the desired rate of additive feed, and controlling the additive feed in accordance therewith, all preferably continuously.

23 Claims, 1 Drawing Sheet

METHOD FOR CONTROLLING ADDITIVE FEED IN A BOILER SYSTEM

This invention relates to a method for controlling, preferably in a continuous manner, the feed of an additive to a fuel-burning boiler system by sensing the boiler conditions which affect the optimum rate of additive feed and controlling the additive feed in accordance therewith, thus optimizing the effect of the additive.

There are two general areas where fuel combustion presents problems. One general area involves the nature and amount of chemicals which are discharged into the environment. The substances emitted are often corrosive or otherwise damaging to any surfaces on which they fall. In many instances they are harmful to human or plant life, and in many instances they contribute to the formation of smog. These problems are today very generally recognized as quite serious, and strenuous efforts are being made to reduce the environmental pollution attendant upon combustion. The other general area, boiler fouling as a result of the formation of various substances in the boiler which coat the walls or tee tubes of the boiler, constitutes a direct economic problem, since it reduces the efficiency of heat transfer and, when the build-up of materials becomes too great within the boiler, necessitates that the boiler be shut down from time to time for cleaning purposes, an obviously uneconomical procedure.

In general, different fuels present different problems. With sulfur-containing fuels, one of the major problems is the concentration of sulfur dioxide and sulfur trioxide in the stack gases. These compounds are extremely deleterious from a pollution point of view. When fuels contain vanadium in addition to sulfur, the production of undesired sulfur oxides is accentuated; the vanadium, probably in combination with the exposed iron on the tubes in the boiler, is able to catalyze the formation of undesirable sulfur oxides. Since both sulfur and vanadium are present in many of the commonly available industrial fuels, these problems are very pressing from a pollution control standpoint.

One standard approach to minimizing pollution problems is to add various substances to the fuel with a view to having those substances enter into chemical combination with the undesired products of combustion in order to render them less undesirable or more readily removable from the stack emissions. Many different substances have been proposed to this end, including manganese and magnesium, usually introduced into the fuel in the form of compounds such as oxides and hydroxides. It is the manganese and magnesium which are the active ingredients, the oxides and hydroxides being chosen as the addition media because they are more readily available and handleable than the active metals themselves.

With these additives, as with other additives, problems often arise. In some instances the additives, while entering into the expected reactions, also enter into side reactions the products of which present their own individual problems, which sometimes outweigh the problems which are intended to be cured. Also, in some instances particular additives, especially when used in large quantities, cause such fouling of the interior of the boiler as to make them undesirable from an economic point of view. Moreover, all additives are costly, and if especially large amounts of a particular additive are required in order to produce a given improvement the cost may be prohibitive from a commercial point of view.

In many instances the rate at which additive is introduced into the boiler system is not particularly critical, especially when the optimum rate is dependent primarily only on one operating parameter of the system, such as the rate at which fuel is fed into the system, and where departure from optimal additive rate has no serious consequences. Under those circumstances control of the additive feed can be manually accomplished in a non-optimum but acceptable manner. There are, however, additives which require much more sophisticated control for optimum effectiveness, usually because the optimum additive rate is dependent upon a complex interrelationship with a plurality of system operation parameters. The difficulty in controlling the rate of addition of such substances, and the deleterious results when those substances are not fed at their optimum rates for a given system operation condition, have militated against the use of such additives even though their use in optimum rates would be exceedingly advantageous. This has proven to be particularly prevalent in connection with the addition of manganese and/or magnesium to boiler systems, especially when the magnesium is introduced into the boiler system at a low temperature station.

In the co-pending application Ser. No. 083,161 filed Aug. 10, 1987 by Ira Kukin and entitled "Combustion Control By Addition of Magnesium Compounds of Particular Particle Sizes", it is taught that a blend of coarse and fine magnesium compounds has a particularly beneficial effect when utilized as a cold-end additive. The opacity of the gases emanating from the stacks is improved, plume and acid smut are greatly reduced, the tendency of the air heaters to plug is reduced and corrosion of the air heaters is reduced, thus resulting in greater cleanliness, less need for cleaning and less costly maintenance or replacement of corroded parts. In addition, lesser quantities of that blend of different particle sizes can be employed, thus resulting in significant improvement in economy of operation.

Experience with the addition of magnesium to low temperature areas of the boiler system has demonstrated that it is very important that the dosage of the additive be proper in order to obtain optimum results. If a boiler operating under particular conditions is fed an insufficient amount of additive, all of the $SO_3$ in the boiler effluent will not be neutralized and as a result corrosion and pluggage will occur. On the other hand, if the boiler conditions change so that the additive injection system is metering larger than optimum doses of additive, this tends to increase the possibility of pluggage and is in any event wasteful and expensive. Moreover, a determination of the optimum feed rate for an additive such as magnesium involves a complex evaluation of a plurality of operating parameters all of which tend to vary with time as the boiler system operates. The load that is placed on the system at any given moment, the rate at which fuel is fed, the amount and temperature of combustion air and the temperature of the gas escaping from the system, and the $SO_3$ content of that gas are the main factors affecting the optimum additive feed rate for the additive in question, and most or all of those parameters will vary from time to time as a given industrial boiler system is operated. The situation presented is sufficiently complex so that control of such an additive feed by an individual supervising the operation of the system is only partially effective, not only because the controlling parameters vary with time but also because each parameter has its own characteristic effect on optimum additive feed, making most difficult the manual determination of that optimum feed rate at any given moment even if, which is usually not the case, the individual operator is constantly aware of the magnitude of al of the relevant parameters.

In accordance with the present invention optimal use of additives in a boiler system is assured by monitoring those system parameters which most significantly affect the need for a particular additive, computing what effect a variation in each sensed parameter has on the optimum additive feed rate, combining the results of those computations in order to determine the optimum feed rate at a particular moment, sensing the actual feed rate at that moment, and modifying that actual feed rate where necessary in order for it to conform to the optimum feed rate, all preferably continuously. The requisite computations, both with respect to determining the magnitude and direction of feed rate corrections brought about by changes in each parameter and the combining of those parameter effects, can readily be accomplished by currently available computer equipment, particularly since the advent of microprocessors, and control of the actual additive feed rate pursuant to the results of those computations can be accomplished through conventional feedback control systems. In addition, the computer can be so programmed as to control additive feed appropriately in the event of special conditions, such as system start-up, system shutdown and operation of the system at particularly low levels.

The computations involved will vary for each additive, and for a given additive will vary at least to some degree, and sometimes to a significant degree, from one boiler system to another. Because no two boiler systems behave alike, and because the precise relationships between particular parameters and additive feed rate may not be precisely known, the computational factors may be tailored to each boiler system, usually on an empirical, trial-and-error, basis, but once that tailoring has been accomplished, the system will then have its additive feed rate continuously and effectively monitored and controlled, subject to, but not requiring, manual supervision.

To the accomplishment of the above, and to such other objects as may hereinafter appear, the present invention relates to a method of controlling the feed of an additive to a fuel-burning boiler system, as described in this specification, taken together with the accompanying drawings, in which FIG. 1 is a diagrammatic representation of a system for controlling additive feed to two boilers.

For purposes of illustration the method of the present invention will be explained as carried out in an installation comprising two boiler systems I and II each with a pair of air heaters A and B respectively defining low temperature areas where the additive in question, e.g., a magnesium compound, is added to the system as, for example, taught in the previously referred-to copending application Ser. No. 083,161. The boilers I and II may be used for the generation of electricity, a common application where the system must be operated over a varying range of conditions, because demand for electricity varies from day to day and from one part of the day to another, as is well known to those involved in electricity generation. It is precisely because the operating conditions do vary that it becomes essential to control the additive feed so as to conform to those conditions as they change.

The additive may be stored in a supply container 2 from which four individually adjustable feed control elements 4, 6, 8 and 10 control the feed of additive to lines 12, 14, 16 and 18 respectively which lead to air heaters IA, IB, IIA and IIB respectively. The blocks 20 and 22 schematically represent a collection of sensors which monitor relevant parameters of the operation of the boilers I and II respectively. The parameters monitored will depend upon the particular additive involved and the factors which affect the functioning of that additive. For example, for a magnesium additive injected into the system at a low temperature station such as at or adjacent to the air heater, relevant parameters are the load on the system (which can be measured in megawatts), the fuel oil flow (which can be measured in pounds per hour and which also must take into account the heat value of the fuel oil, which can be measured in BTUs per pound), the temperatures of the air going into the system and the gas going out of the system (which may be measured in degrees Centigrade), the amount of excess air (which may be in the form of a dimensionless ratio), the amount of $SO_3$ in the effluent (which may be measured in terms of parts per million) and, under some circumstances, the opacity of the effluent (which may be represented by a dimensionless factor).

The outputs from the sensors 20 and 22 are conveyed over lines 24 and 26 respectively to signal conditioners 28 and 30 respectively for the boilers I and II respectively, where the actual sensor outputs, which may well be in analog form, are converted to forms suitable as inputs to the microprocessor 32.

In the microprocessor 32, and separately for each of the boilers I and II, the conditioned parameter signals are analyzed and combined in accordance with a predetermined set of relationships in order to produce signals representative of the optimum additive feed for the parameters sensed at a given point in time. Those signals, one for each of the additive feeds to be controlled, are sent over lines 34, 36, 38 and 40 respectively to signal conditioners 42, 44, 46 and 48 respectively, which conditioners convert the microprocessor output signals into a form suitable to be transmitted over lines 50, 52, 54 and 56 respectively to feed controllers 58, 60, 62 and 64 respectively, which controllers are in turn operatively connected, by lines 66, 68, 70 and 72 respectively, to the additive feed control elements 4, 6, 8 and 10 respectively. These elements function in a conventional feedback-type control system in order to bring the additive feed rate in each of the lines 12, 14, 16 and 18 to those values computed by the microprocessor 32 and transmitted over lines 34, 36, 38 and 40 respectively. This is done, as is conventional, by sensing the actual feed rate at each of the elements 4, 6, 8 and 10, transmitting that sensed value to the appropriate feed controller 58, 60, 62 or 64, and there comparing that sensed value with the desired optimum values computed by the microprocessor 32. If a sensed value is greater than a computed optimum value for a given boiler and air heater the appropriate feed controller 58, 60, 62 or 64 will adjust the feed control elements 4, 6, 8 or 10 to reduce the additive flow, and if the sensed value is less than the computed optimum value the feed control element 4, 6, 8 or 10 will be adjusted in the opposite direction in order to increase the additive flow.

Although the method of the present invention is perhaps most advantageous when carried on not only continuously but also instantaneously, situations may arise where intermittent control rather than continuous control is called for. Also, it may be desired for various reasons, such as the rapid variability of a given parameter, to sense that parameter, store the sensed values in memory, and then at suitable intervals compute an operative parameter value, as, for example, by averaging the values obtained over a predetermined period of time.

Determination of the SO3 content in a form suitable for use in connection with the method here disclosed has been found to present uncertainties. We have found that actual detection of SO3 is not necessarily reliable, and we therefore prefer to determine the usable SO3 value in several different ways, such as by the use of an SO3 monitor, by using the output of an acid dew point meter, and by using a theoretical computation derived from other parameters, comparing the results produced by each type of determination and then producing an effective SO3 value to use in the additive feed rate computation by analyzing the plurality of SO3 values determined in these different ways. For example, if two out of three values conform but the third value is quite different, that third value might be disregarded, or, based upon empirical findings, a weighting can be applied to each of the values and the weighted values then averaged.

The parameter values will then be combined by the microprocessor 32 in an appropriate fashion to determine the proper additive dose to be injected into the boiler. As has been indicated, the computation will vary from additive to additive and may also vary from boiler to boiler, and therefore the actual computational basis may be determined on a trial-and error basis, the boiler system being operated under different conditions, the effects of different additive rates at those different conditions being observed, and judgments being made as to the optimum changes in additive rate with respect to changes in specific operating conditions. In one installation where magnesium was injected into the system at a low temperature station a treatment rate calculation was carried out according to the following formula, it being understood that this is merely exemplary. In this formula lower case letters represent predetermined numbers:

The treatment rate as thus computed, after it passes through the appropriate signal conditioner 42, 44, 46 or 48 and is modified thereby, is then inputted into the appropriate feed controller 58, 60, 62 or 64 which also accepts input signals from the actual feed control elements 4, 6, 8 or 10 and which compares the computed and actual feed rates and controls the actual feed rates accordingly.

It has been observed that when certain boiler systems are operating at loads considerably less than normal, more additive than normal is required. When this is the case the microprocessor will be so programmed that when such a greatly reduced load is sensed the calculated rate will be increased by some predetermined amount, such as a predetermined percentage.

The system has been thus far described as being continuously operating on line. The system can be readily adapted to control additive feed when the system is first turned on, and when the system is turned off line, since each of those situations may call for special feed rates. For example, when a system is turned off line it is desirable that the additive feed be continued for a certain period of time in order to provide the boiler with appropriate protection. To that end the microprocessor, when it learns that the system has been turned off line, as by monitoring the fuel flow and load signals, will provide an output feed signal of an appropriate magnitude, perhaps independent of the above computation, for a predetermined period of time, then turning the additive feed off. During system start-up the microprocessor can similarly provide an additive feed signal appropriate to start-up conditions for an appropriate period of time before shifting to continuous on-line computation as described.

The microprocessor can also control the actuation of suitable indicators and/or alarms to show the status of the boiler system (on line, off line, excessively low load, etc.) and, if desired, to display on meters or on a cathode ray tube, and/or to record, values of sensed parameters and additive feed rates as desired.

The $K_1/K_2$ factor in the disclosed computation is designed to take care of the situation presented when the preheater steam coils are on or off. If the preheater steam coils are on less heat is available for making $$TR = \left[ 1/a \times b \times \left( \frac{c \times \text{HEAT VALUE} \times \text{FUEL FLOW} \times (1 + \text{EXCESS AIR}) + \text{FUEL FLOW}}{d} \right) + (K_1/K_2) \right] \times SO_3$$

In this computation
$K_1$ = normal combustion air-in temp (° C.)+normal gas-out temp (° C.),
$K_2$ = actual combustion air-in temp (° C.)°actual gas-out temp (° C.) and
EXCESS AIR = % excess $O_2$/e x % excess $O_2$.

If desired, empirical observation of effluent opacity may also produce a factor to be included in that computation.

steam, and this affects the need for additive. The $K_1$ figure represents combustion air temperatures with the steam coils on, and hence that $K_1/K_2$ factor will be equal to 1 when the steam coils are on but will have some other value when the steam coils are off.

Table #1 represents selected sets of varying parameters with appropriate treatment rate figures, those values demonstrating that the treatment rate is not a linear function depending only on one boiler control variable, but instead bears a complex relationship to a significant number of differing operating parameters.

TABLE #1

| BOILER CONTROL INPUTS | EXAMPLE #1 Steam Coils On | | EXAMPLE #2 Steam Coils On | | EXAMPLE #3 Steam Coils On | | EXAMPLE #4 Steam Coils Off | |
|---|---|---|---|---|---|---|---|---|
| | Good Operation 1 | Poor Operation 2 | Good Operation 3 | Poor Operation 4 | Good Operation 5 | Poor Operation 6 | Good Operation 7 | Poor Operation 8 |
| Megawatts (Load) | 300 | 300 | 225 | 225 | 150 | 150 | 150 | 150 |
| SO3 (ppm$_v$) | 30 | 40 | 25 | 25 | 20 | 30 | 20 | 30 |

TABLE #1-continued

| BOILER CONTROL INPUTS | EXAMPLE #1 Steam Coils On | | EXAMPLE #2 Steam Coils On | | EXAMPLE #3 Steam Coils On | | EXAMPLE #4 Steam Coils Off | |
|---|---|---|---|---|---|---|---|---|
| | Good Operation 1 | Poor Operation 2 | Good Operation 3 | Poor Operation 4 | Good Operation 5 | Poor Operation 6 | Good Operation 7 | Poor Operation 8 |
| $O_2$ (%) | 1.0 | 1.5 | 1.3 | 2.3 | 1.5 | 2.5 | 1.5 | 2.5 |
| Fuel Oil Flow (lbs/hr) | 136,000 | 136,400 | 102,600 | 103,000 | 69,000 | 69,500 | 68,300 | 68,800 |
| Heat Value (BTU/lb) | 18,266 | 18,266 | 18,266 | 18,266 | 18,266 | 18,266 | 18,266 | 18,266 |
| Air In Temp (°C.) | 82 | 80 | 78 | 75 | 75 | 72 | 28 | 25 |
| Gas Out Temp (°C.) | 162 | 160 | 150 | 130 | 145 | 125 | 110 | 100 |
| Excess Air (%) | 5.0 | 7.8 | 6.7 | 12.4 | 7.8 | 13.7 | 7.8 | 13.7 |
| K (°C.) | 244 | 244 | 244 | 244 | 244 | 244 | 244 | 244 |
| Treatment Rate (lbs/hr) | 92.8 | 126.7 | 66.8 | 100.8 | 44.6 | 71.7 | 56.9 | 92.8 |

Through the use of the method of the present invention additive feed is optimized continuously over a wide range of operating parameters in an automatic fashion and without requiring any judgment on the part of the operator. Once the computational basis for the feed rate computation has been determined the microprocessor 32 can be appropriately programmed by means of the keyboard 74 and the system is then ready for constantly monitored and controlled operation, which will increase boiler efficiency, optimize additive costs, make for greater dependability and reduce repair costs due to corrosion damage.

While the method of the present invention has been here described in connection with the feed of magnesium to a low temperature station in an electricity generating boiler system, it will be appreciated that this is by way of exemplification only, and that the present invention is of broader significance, as defined in the appended claims.

We claim:

1. A method of controlling the feed of an additive to a fuel-burning boiler system which comprises:
    (a) detecting a plurality of boiler operational parameter values and converting said values to corresponding boiler parameter signals;
    (b) converting each of said boiler parameter signals to a control signal in accordance with its own characteristic conversion program;
    (c) combining each of said control signals in accordance with a predetermined schedule;
    (d) detecting the existing additive feed and producing a corresponding computed additive feed signal, and
    (e) comparing said existing additive feed signal and said computed additive feed signal and modifying the additive feed to cause it to conform to said computed additive feed signal if necessary.

2. The method of claim 1, in which some of said boiler parameter signals are converted to corresponding control signals in real time and others of said boiler parameter signals are combined over a predetermined period of time before being converted into a corresponding control signal.

3. In the method of either of claims 1 or 2, sensing when the boiler system is not operating within a normal range and (a) producing a computed additive feed signal corresponding to that boiler operation without regard to the other boiler parameter signals and (b) maintaining that computed additive feed signal, and causing the additive feed to correspond thereto, for a predetermined period of time.

4. The method of either of claims 1 or 2, in which desired ones of said feed signals are displayed for operator monitoring.

5. The method of either of claims 1 or 2, in which one of said parameters is a sulfur trioxide content parameter which involves separate value determinations by (a) the output of a sulfur trioxide monitor, (b) the output of an acid dew point meter, and (c) a theoretical computation based upon other boiler operational parameters, with the effective $SO_3$ content signal being produced by combining those three values in a predetermined fashion.

6. The method of either of claims 1 or 2, in which one of said parameters is a sensed load parameter and in which, if the sensed load parameter is at a predetermined level lower than normal, the computed additive feed signal is increased by a predetermined amount before being compared with the existing additive feed signal.

7. The method of either of claims 1 or 2, in which said predetermined schedule for combining each of said control signals to produce said computed additive feed signal includes using as factors heat value, fuel flow, an excess air-fuel flow factor and $SO_3$ content.

8. The method of either of claims 1 or 2, in which said predetermined schedule for combining each of said control signals to produce said computed additive feed signal includes using as factors heat value, fuel flow, an excess air-fuel flow factor and $SO_3$ content and using as an additive a factor reflecting the degree of use of generated steam for pre-heating purposes.

9. The method of either of claims 1 or 2, in which a plurality of different additives are involved with each additive having its own set of characteristic programs for converting boiler parameter signals to corresponding control signals and each has its own predetermined schedule for combining its respective control signals to produce its own computed additive feed signal, with the feed of each additive being individually controlled in accordance therewith.

10. The method of either of claims 1 or 2, in which additive is fed simultaneously to a plurality of different boiler systems, the method of the parent claim being carried out individually for each such boiler system.

11. A method of controlling the feed of an additive to a fuel-burning boiler system which comprises:
    (a) detecting a plurality of boiler operational parameter values, said parameters being members of the group consisting of load, fuel feed, amount and temperature of combustion air, sulfur trioxide content, exit gas temperature and effluent opacity, and converting said values to corresponding boiler parameter signals;
    (b) converting each of said boiler parameter signals to a control signal in accordance with its own characteristic conversion program;

(c) combining each of said control signals in accordance with a predetermined schedule;
(d) detecting the existing additive feed and producing a corresponding computed additive feed signal, and
(e) comparing said existing additive feed signal and said computed additive feed signal and modifying the additive feed to cause it to conform to said computed additive feed signal if necessary.

12. The method of claim 11, in which some of said boiler parameter signals are converted to corresponding control signals in real time and others of said boiler parameter signals are combined over a predetermined period of time before being converted into a corresponding control signal.

13. In the method of either of claims 11 or 12, sensing when the boiler system is not operating within a normal range and (a) producing a computed additive feed signal corresponding to that boiler. operation without regard to the other boiler parameter signals and (b) maintaining that computed additive feed signal, and causing the additive feed to correspond thereto, for a predetermined period of time.

14. The method of either of claims 11 or 12, in which desired ones of said feed signals are displayed for operator monitoring.

15. The method of either of claims 11 or 12, in which the sulfur trioxide content parameter involves separate value determinations by (a) the output of a sulfur trioxide monitor, (b) the output of an acid dew point meter, and (c) a theoretical computation based upon other boiler operational parameters, with the effective $SO_3$ content signal being produced by combining those three values in a predetermined fashion.

16. The method of either of claims 11 or 12, in which, if the sensed load parameter is at a predetermined level lower than normal, the computed additive feed signal is increased by a predetermined amount before being compared with the existing additive feed signal.

17. In the method of claim 16, sensing when the boiler system is not operating within a normal range and (a) producing a computed additive feed signal corresponding to that boiler operation without regard to the other boiler parameter signals and (b) maintaining that computed additive feed signal, and causing the additive feed to correspond thereto, for a predetermined period of time.

18. The method of claim 16, in which the sulfur trioxide content parameter involves separate value determinations by (a) the output of a sulfur trioxide monitor, (b) the output of an acid dew point meter, and (c) a theoretical computation based upon other boiler operational parameters, with the effective $SO_3$ content signal being produced by combining those three values in a predetermined fashion.

19. The method of claim 16, in which said predetermined schedule for combining each of said control signals to produce said computed additive feed signal includes using as factors heat value, fuel flow, an excess air-fuel flow factor and $SO_3$ content.

20. The method of either of claims 11 or 2, in which said predetermined schedule for combining each of said control signals to produce said computed additive feed signal includes using as factors heat value, fuel flow, an excess air-fuel flow factor and $SO_3$ content 21. The method of either of claims 11 or 12, in which said predetermined schedule for combining each of said control signals to produce said computed additive feed signal includes using as factors heat value, fuel flow, an excess air-fuel flow factor and $SO_3$ content and using as an additive a factor reflecting the degree of use of generated steam for pre-heating purposes.

22. The method of either of claims 11 or 12, in which a plurality of different additives are involved with each additive having its own set of characteristic programs for converting boiler parameter signals to corresponding control signals and each has its own predetermined schedule for combining its respective control signals to produce its own computed additive feed signal, with the feed of each additive being individually controlled in accordance therewith.

23. The method of either of claims 11 or 12, in which additive is fed simultaneously to a plurality of different boiler systems, the method of the parent claim being carried out individually for each such boiler system.

* * * * *